March 2, 1965 T. J. SCARNATO ETAL 3,171,242
MOWER AND GUARD STRUCTURE THEREFOR
Filed Feb. 5, 1963 2 Sheets-Sheet 1
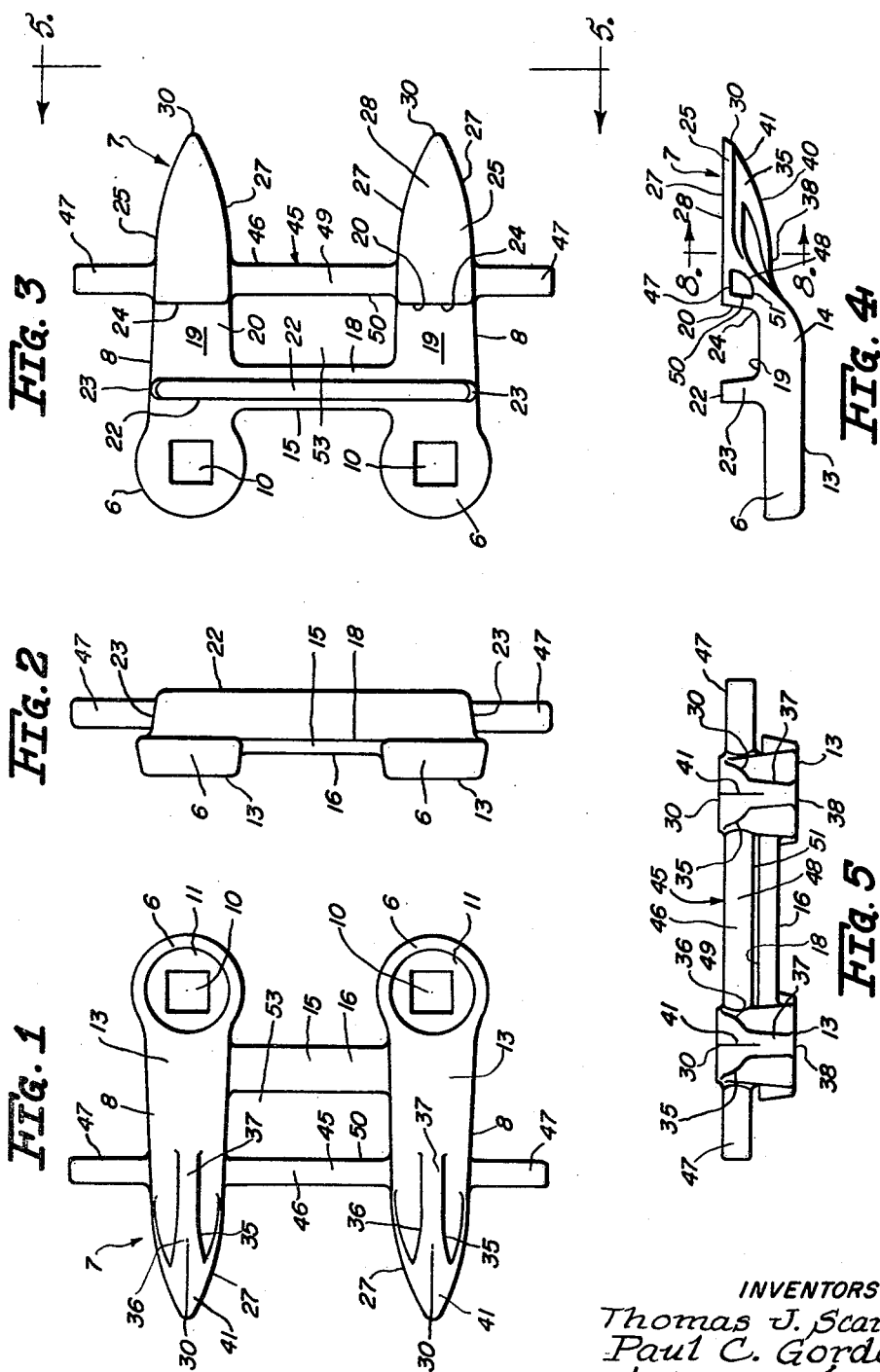
INVENTORS
Thomas J. Scarnato
Paul C. Gordon
ATTORNEY

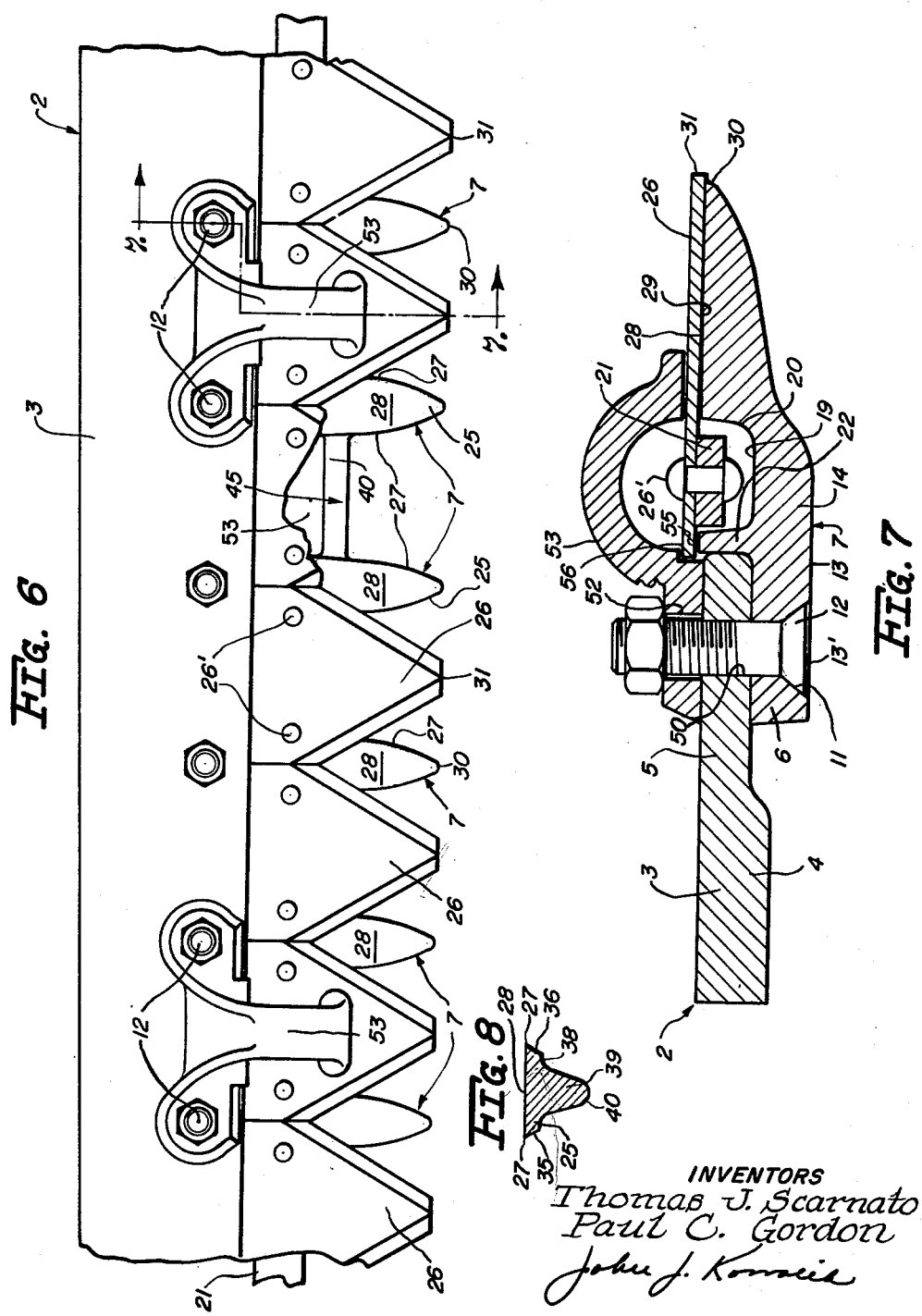

United States Patent Office 3,171,242
Patented Mar. 2, 1965

3,171,242
MOWER AND GUARD STRUCTURE THEREFOR
Thomas J. Scarnato, Park Ridge, and Paul C. Gordon, Riverside, Ill., assignors to International Harvester Company, Chicago, Ill., a corporation of New Jersey
Filed Feb. 5, 1963, Ser. No. 256,367
7 Claims. (Cl. 56—310)

This invention relates to mowers, and more specifically to a novel mower construction which is adapted to cut through rank growth and/or through previously-cut material.

It is well known in the art that with current reciprocating type mowers, it is virtually impossible to cut through rank grass growth or through previously-cut material. Such material would normally hang onto the guards and clog the mower so that no cutting action is possible.

The general object of the invention is to provide a novel, simple, efficient and rugged mower of the reciprocating type which functions equally well in cutting standing material as well as rank and downed grasses and the like.

A more specific object of the invention is to provide a novel mower comprising a reciprocating sickle and a stationary cutting member which incorporates a plurality of stub guards of novel construction facilitating entry of the material into the mower.

A still further novel object of the invention is to provide a novel stub guard construction for a reciprocating type mower wherein the guards are so contoured to provide extremely shallow depth and which are so arranged so as to comb under the material and thus gather it for presentation to the cutting means.

A further object of the invention is to provide a novel mower construction comprising a reciprocating sickle which includes a plurality of points or sections which project slightly ahead of the stub guards to present an active forward cutting edge, said guards being of extremely narow width as compared to the sickle sections so that the spaces between them are of larger area than the V-shaped notches between the forwardly diverging edges of adjacent sections.

A still further object of the invention is to provide a novel guard construction which comprises a cutting portion at opposite sides of which there are provided deflector wings for deflecting the cut material away or under the bar.

The invention contemplates the provision of a novel guard structure which comprises a cutting point portion which has been suitably hardened, etc. to provide a cutting edge without the necessity of supplying additional ledger plates and the like.

These and other objects of the invention will become more readily apparent from the specification and the drawings wherein:

FIGURE 1 is a bottom view of the novel stub guard construction;

FIGURE 2 is a rear view;

FIGURE 3 is a top view;

FIGURE 4 is an edge view;

FIGURE 5 is a front end view taken substantially on the line 5—5 of FIGURE 3;

FIGURE 6 is a fragmentary plan view partly broken away of the novel mower incorporating the invention;

FIGURE 7 is a sectional view taken substantially on the line 7—7 of FIGURE 6; and FIGURE 8 is a cross-section taken substantially on line 8—8 of FIGURE 4.

Describing the invention in detail and having particular reference to the drawings there is shown a novel mower construction generally designated 2 which comprises a support or finger bar 3 having a thick rear portion 4 and a thinner forward portion 5. The forward portion 5 overlaps the rear mounting or anchorage portion 6 of the guards generally designated 7.

Each guard 7 is a bilaterally symmetrical structure and at each side thereof comprises a fore and aft elongated finger portion 8 which at its rear is integrated with the associated rear mounting portion 6 which is generally somewhat eye-shaped in plan view and has a bolt hole opening 10 with an enlarged bottom recess 11 which admits bolt head 12 therein, said bolt head 12 having a bottom edge 13' which is above the bottom edge surface 13 of the mounting portion 6 as well as of the knife guide body portion 14 of the guard portion 8, said body portion 14 projecting forwardly from the mounting portion 6. The bolts project above the portion 5 through openings 50 therein and through apertures 51 in the mounting portions 52 of the knife holder 53 which has a curved clamping portion 54 projecting forwardly of the bar portion 5 and terminating in a knife guiding node 55 presenting a bottom guide surface 56.

The finger portions 8, 8 are interconnected at the junction of the portions 6, 14 by means of a transversely extending spanner and deflector rib 15 which is integrally united with the finger portions and which has a lower surface 16 which is spaced vertically above the level of the under surfaces 13. The rib 15 provides a top edge longitudinal ledge 18 between the body portions 8, 8 coplanar with the top surfaces 19, 19 of said body portions and forms the bottom of a trough or channel 20 for a knife back 21 which fits within the channel against an upstanding rear flange 22 which is formed integral with the top side 18 of the rib 15 and extends upwardly therefrom, said flange 22 extending beyond the ends of shelf 18 to the outer edges 23, 23 of the body portions 8, 8 of the guards. The forward side of the channel 20 is formed by the back or rear edges 24 of the ledger sections 25 which are slightly more than one-third of the width of the knife sections 26 which overlie the same and with which the ledger portions 25 of the finger portions 7 cooperate, said sections being secured to the knife back 21 as by rivets 26'.

In fact, the knife sections are approximately three and one-half times wider than the ledger sections 25 at their base ends and these ledger sections are provided with arcuate lateral cutting edges 27, 27 at opposite lateral edges of the flat top surface 28 on which the flat underside surface 29 of the associated knife section 26 rides. The edges 27, 27 taper or converge forwardly into a point 30 and project forwardly about ¼″–⅛″ behind the forward or free unsupported outer ends 31 of the knife sections 26 which present live points at the forward side of the mower. The ledger plate sections or portions are relatively thin and of the order of .56 inch or roughly about 9/16 of an inch in depth at their thickest region which is at substantially the line 8—8 of FIGURE 4. It will be seen that lateral sides 35 and 36 converge downwardly into a bottom surface 38 which merges into the central vertical rib 39. Thus the underside of the ledger plate portion is relatively narrow and is substantially T-shaped in cross section as seen in FIGURE 8. The under edge 40 of the rib 39 is of convex configuration and tapers upwardly into the forward point 30 and immediately behind the point the sides 35, 36 taper to a sharp lower edge section 41. The guard comprises a forward deflector 45 which has an intermediate portion 46 and end portions 47, said intermediate portion 46 interconnecting the ledger portions adjacent to their rear ends and the end portions 47, 47 projecting laterally outwardly from the remote sides of the ledger portions coaxial with the portion 46 adjacent to the upper edges of the ledger portions, and above the level of the brace 16. The portions 46, 47 present a forward and under convex surface 48 and a top generally flat surface 49 and rear substantially flat face 50 which slopes rearwardly and downwardly. The lower part 51 of the surface 50 is at approximately the level of the ledge surface 18.

Portion 46 together with portions 8, 8, 16 and 18 develop an opening 53 which sifts out dirt, etc. and exposes a live element, namely, the knife back to move the crops from thereunder. The rear edges 55 of the sections 26 bear upon the upper edge 56 of the rib 22 whereby the knife is held level.

Having described a preferred embodiment of the invention, it will be noted that various other forms will become readily apparent to those skilled in the art within the scope of the appended claims.

We claim:

1. A mower guard for use in a moving machine comprising a shallow, elongated solid section finger portion and knife guiding and anchorage portions offset downwardly below said finger portion; said finger portion having a ledger surface with cutting edges at opposite sides thereof, said finger portion having a bottom edge offset upwardly from the bottom surface of said anchorage portion and forming a forwardly extending point with the cutting edges, said finger portion having a bottom section with a substantially uniform lateral and downward taper and said finger portion having at its bottom a concave contour forwardly of the bottom surface of the anchorage portion, said finger portion being of thin section between said bottom section and ledger surface.

2. The invention according to claim 1 and deflector bars extending from opposite sides of the finger portion.

3. In a mower, a cutter bar assembly having a finger bar, and a sickle bar mounted in a reciprocal moving relation to the finger bar and having a plurality of sickle sections terminating in free unsupported outer ends, a plurality of sickle guard fingers secured to the finger bar at predetermined intervals and supporting said sickle bar thereupon, each guard finger having a finger portion underlying said sickle sections and terminating slightly short of the free outer ends of the sickle sections whereby said sections provide an active forward edge for the mower to prevent hairpinning material on the guard fingers.

4. The invention according to claim 3 and each finger having a thin finger portion with forwardly converging lateral sides and a bottom sloping upwardly forwardly into a point with said sides.

5. The invention according to claim 4 and each of said guard fingers comprising an integral deflector rib extending laterally from the finger portion and integrally united therewith and providing a downwardly and forwardly convexed deflector surface.

6. The invention according to claim 4 and each said finger portion being less than one third the width of the sickle sections.

7. The invention according to claim 1 and another guard laterally spaced from the first-mentioned guard and substantially identical therewith, a spanner rib between the guards integrally interconnecting said guards at said anchorage portions, a deflector bar between adjacent sides of the finger portions of the guards integrally interconnecting the finger portions, and end extensions of said deflector bar projecting outwardly from remote sides of said finger portions.

References Cited in the file of this patent

UNITED STATES PATENTS

| | | |
|---|---|---|
| 21,414 | Gronberg | Sept. 7, 1858 |
| 572,728 | Shepherd | Dec. 8, 1896 |
| 1,869,981 | Paradise | Aug. 2, 1932 |
| 2,484,630 | Magee | Oct. 11, 1949 |